United States Patent [19]

Bachhuber

[11] Patent Number: 5,675,490
[45] Date of Patent: Oct. 7, 1997

[54] IMMOBILIZER FOR PREVENTING UNAUTHORIZED STARTING OF A MOTOR VEHICLE AND METHOD FOR OPERATING THE SAME

[75] Inventor: Anton Bachhuber, Langquaid, Germany

[73] Assignee: Siemens Aktiengesellschaft, Munich, Germany

[21] Appl. No.: 603,931

[22] Filed: Feb. 20, 1996

[30] Foreign Application Priority Data

Aug. 20, 1993 [DE] Germany ................ 9312504 U
Sep. 30, 1993 [DE] Germany ................ 43 33 474.1

[51] Int. Cl.$^6$ .................................................. B60R 25/04
[52] U.S. Cl. .................... 364/424.037; 364/424.034; 364/424.04; 307/10.2; 307/10.6; 340/825.3; 340/825.32; 340/426
[58] Field of Search ............... 364/424.01, 424.03, 364/424.04, 577, 580; 307/10.2, 10.3, 10.5, 10.6; 180/287, 289; 361/192, 193, 171; 340/426, 825.3, 825.31

[56] References Cited

U.S. PATENT DOCUMENTS

| 4,366,466 | 12/1982 | Lutz | 340/64 |
| 4,477,874 | 10/1984 | Ikuta et al. | 364/424.04 |
| 4,980,680 | 12/1990 | Knoll et al. | 364/825.31 |
| 5,229,648 | 7/1993 | Sues et al. | 307/10.2 |
| 5,382,948 | 1/1995 | Richmond | 340/825.26 |
| 5,473,200 | 12/1995 | Woo | 307/10.2 |
| 5,514,914 | 5/1996 | Selem et al. | 307/10.5 |

FOREIGN PATENT DOCUMENTS

| 0 373 337 | 6/1990 | European Pat. Off. |
| 42 32 435 | 11/1993 | Germany |
| 2 251 503 | 6/1991 | United Kingdom |
| WO93/05987 | 4/1993 | WIPO |
| 93/05987 | 4/1993 | WIPO |

Primary Examiner—Kevin J. Teska
Assistant Examiner—Tan Nguyen
Attorney, Agent, or Firm—Herbert L. Lerner; Laurence A. Greenberg

[57] ABSTRACT

An immobilizer for a motor vehicle and a method for operating the immobilizer include a test unit, control devices connected through a data line to the test unit, and at least one ignition key having a transponder. When the ignition key is actuated, the test unit transmits a request signal through the data line to all of the control devices, which respond thereto by transmitting back identification codes which are compared with desired codes. The test unit prevents starting of the motor if fewer than a prescribed number of control devices reply with their identification code. The test unit enables all of the control devices if at least the prescribed number of control devices reply with their identification code word, in the event of interrogation.

20 Claims, 2 Drawing Sheets

IMMOBILIZER FOR PREVENTING UNAUTHORIZED STARTING OF A MOTOR VEHICLE AND METHOD FOR OPERATING THE SAME

CROSS-REFERENCE TO RELATED APPLICATION

This application is a continuation of international application Ser. No. PCT/DE94/00917, filed Aug. 9, 1994.

BACKGROUND OF THE INVENTION

1. Field of the Invention

The invention relates to an immobilizer for a motor vehicle and a method for operating the same.

An immobilizer is a control unit which protects a motor vehicle against unauthorized use. For that purpose, a user code is sent to the immobilizer by an ignition key having a transponder or by a portable transponder in the form of a smart card. The vehicle can be started only if the user is authorized. The engine control unit is activated, for example, when the user code corresponds to an authorization code. In contrast, if it is attempted to achieve that by using unauthorized keys or transponders or by bypassing the immobilizer, the engine control unit is not enabled.

Nevertheless, the motor vehicle can be used permanently by exchanging the engine control device and bypassing the immobilizer.

2. Summary of the Invention

It is accordingly an object of the invention to provide an immobilizer for a motor vehicle and a method for operating the same, which overcome the hereinafore-mentioned disadvantages of the heretofore-known devices and methods of this general type and which offer the highest security against unauthorized use of a motor vehicle, even if control devices are exchanged, with it being the intention to ensure the availability of the motor vehicle.

With the foregoing and other objects in view there is provided, in accordance with the invention, an immobilizer for a motor vehicle, comprising a common data line; control devices of a motor vehicle each storing or generating an identification code word with the aid of an algorithm and each being connected to the common data line; and at least one test unit of the motor vehicle storing or calculating desired code words with the aid of an algorithm identifying the control devices; the at least one test unit being connected through the common data line to the control devices; the at least one test unit transmitting a request signal, at least during every engine starting operation, through the data line to at least some of the control devices, causing the at least some control devices to transmit back their identification code words; the at least one test unit comparing the identification code words being sent back with the desired code words; the at least one test unit leaving at least one of the control devices in an inactive state, for preventing starting or driving of the motor vehicle if fewer than a prescribed number of the control devices reply with their identification code word in the event of an interrogation for the identification code words; and the at least one test unit enabling all of the control devices if at least the prescribed number of the control devices reply with their identification code word in the event of the interrogation.

In accordance with another feature of the invention, the at least one test unit and one of the control devices form a structural unit.

In accordance with a further feature of the invention, the identification code words or the algorithm for calculating the identification code words are stored in at least one of the control devices or in at least one portable user code generator.

In accordance with an added feature of the invention, there is provided a user code generator storing or generating a user code word with the aid of an algorithm, and an initiation device for transmitting the user code word by radio to the at least one test unit causing the request signal to be initiated if the user code word corresponds to an authorization code word stored in the at least one test unit.

In accordance with an additional feature of the invention, there is provided a steady-state identification code generator in which all of the identification code words are stored and with the aid of which either all of the control devices or only the control devices having been exchanged for defective control devices, are re-initialized.

With the objects of the invention in view, there is also provided a method for operating an immobilizer for a motor vehicle, which comprises transmitting a request signal from a test unit through a data line to at least some control devices, at least during every engine starting operation, causing the at least some control devices to transmit back identification code words; comparing the identification code words being sent back with the desired code words, in the test unit; leaving at least one of the control devices in an inactive state, with the test unit, for preventing starting or driving of a motor vehicle if fewer than a prescribed number of the control devices reply with their identification code word in the event of an interrogation for the identification code words; and enabling all of the control devices, with the test unit, if at least the prescribed number of control devices reply with their identification code word, in the event of the interrogation.

In accordance with another mode of the invention, there is provided a method which comprises placing at least one of the control devices into an inactive state, with the test unit, after a predetermined time period, if more than the prescribed number of control devices, but not all of the control devices, reply with their identification code word in the event of the interrogation for the identification code words.

In accordance with a further mode of the invention, there is provided a method which comprises carrying out a first initialization, with the test unit, if the test unit recognizes that at least a majority of the control devices being connected to the data line are in a basic state, and carrying out a re-initialization, with the test unit, if it is recognized that at least one of the control devices is in the basic state and remaining control devices as well as at least one user code generator are assigned to the immobilizer as being authorized.

In accordance with a concomitant mode of the invention, there is provided a method in which the test unit or the user code generator detects the number of engine starting operations with the aid of at least one counter and places the motor vehicle into an inactive state after a predetermined number of engine starting operations, for preventing the motor vehicle from being moved, if the counter is not reset to zero by an external RESET unit.

In this method and device, a plurality of control devices, for example for controlling the air quantity, the fuel injection, the ignition, the gearbox, an airbag or the central locking system, each have an identification code which, upon request, is sent by the immobilizer through a data line to a test unit and is compared there with a desired code. If at least a predetermined number of control devices do not reply with their identification code or do not reply at all, then all or some of the control devices remain in an inactive state, with the result that the motor vehicle cannot be started or driven.

Indeed, all of the control devices would have to be exchanged for the purpose of unauthorized use of the motor vehicle, and that involves a very high outlay.

In this case, the test unit can be accommodated in a control device. The control devices or exchanged control devices can be initialized by using an identification code generator. The situation in which control devices that are not absolutely necessary for the operation of the motor vehicle have failed, is temporarily tolerated in the case of this immobilizer, but those control devices must be exchanged after a period of time, since otherwise the motor vehicle is placed into an inactive state by the test unit. This has the advantage of permitting the motor vehicle to still be started and taken to a service station when a control device, that is a control device which is not absolutely necessary for operation, or the test unit itself, is defective and must be exchanged. The test unit may be an independent control device which is absolutely necessary for the operation of the motor vehicle. However, it may also be accommodated in a control device which is present anyway.

The number of starting operations can be added up by a counter. The test unit places the motor vehicle into an inactive state if the counter reading is not occasionally reset to zero by an external and authorized RESET unit.

Other features which are considered as characteristic for the invention are set forth in the appended claims.

Although the invention is illustrated and described herein as embodied in an immobilizer for a motor vehicle and a method for operating the same, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
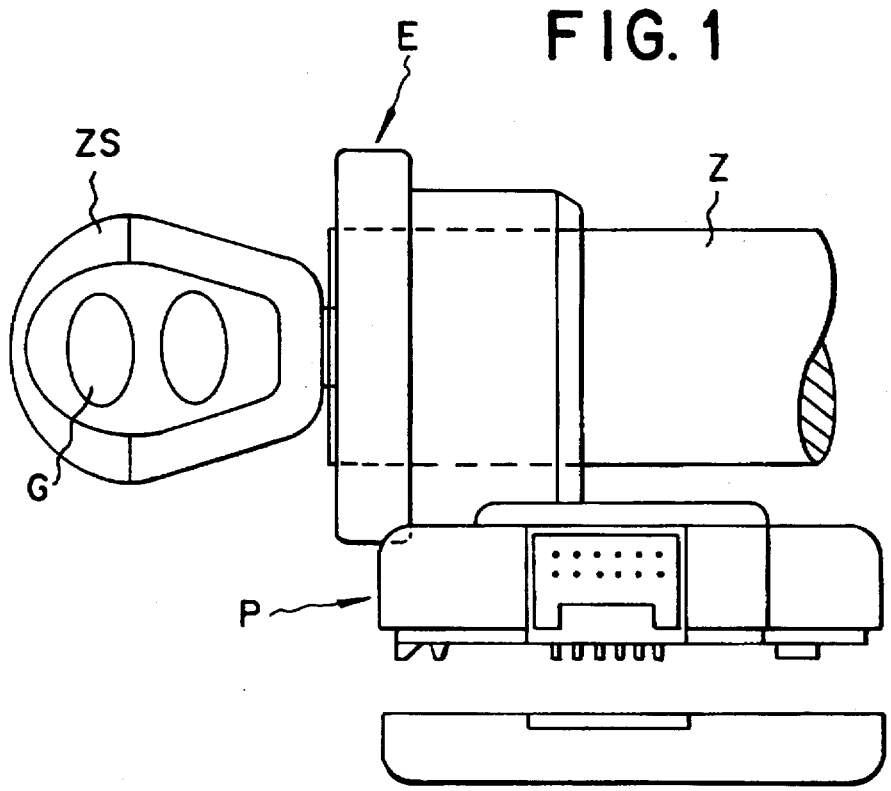
FIG. 1 is a fragmentary, diagrammatic, side-elevational view of an immobilizer according to the invention.

Referring now to the figures of the drawing in detail and first, particularly, to FIG. 1 thereof, there is seen an immobilizer for a motor vehicle which can prevent the intended use of the motor vehicle by an unauthorized user. FIG. 1 shows a test unit P of the immobilizer which may be disposed in a housing on an ignition lock Z of the vehicle. As soon as an ignition key ZS is inserted in the lock and actuated, the immobilizer checks the authorization of the user in the test unit P.

For this purpose, a user code word (referred to below as a user code) is communicated wirelessly or by radio to a transmitting and receiving antenna E of the immobilizer by a transponder G (user code generator) which is connected to the ignition key. If a plurality of users are to be authorized, then they all have a dedicated ignition key ZS with respectively dedicated user codes. The test unit P compares the user code with an authorization code word (referred to below as an authorization code) which is stored in the test unit P. In the event of correspondence, the vehicle can be enabled for the intended use. For this purpose, for example, the engine control device which is inhibited in the untested state can be unlocked, with the result that the engine can be started.

Figure 2:
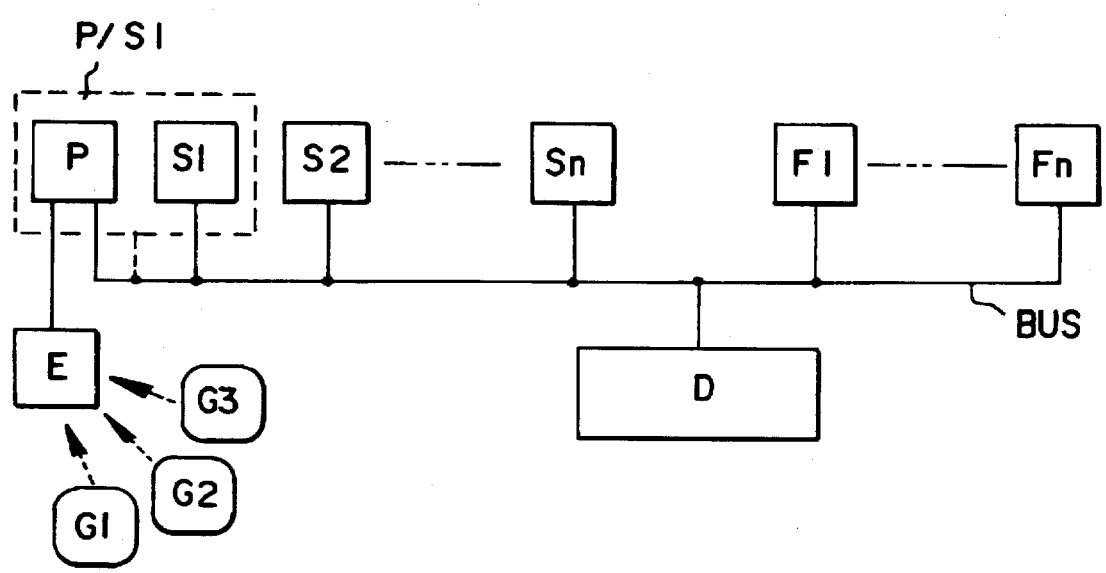
FIG. 2 is a block circuit diagram of the immobilizer.

In order to ensure that the immobilizer may not be circumvented solely by exchanging an engine control unit, the test unit P is connected to further control devices $S_i$ and $F_j$ in the motor vehicle through a data line BUS. In FIG. 2, where i=1 to m and j=1 to n, the control devices $S_i$ are operationally pertinent control devices, such as the engine control unit, and the control devices $F_j$ are non-operationally pertinent control devices such as an air bag control device, for example. All of the control devices $S_i$ and $F_j$ are present anyway, for example in the form of an ignition, ABS, central locking system, gearbox, level control device, etc., and are checked by the immobilizer when an attempt is made to start the motor vehicle. In the case of unauthorized use, the operationally pertinent control devices remain inhibited, with the result that the motor vehicle cannot be started. All of the control devices $S_i$ and $F_j$ would then have to be exchanged in order to circumvent the immobilizer.

The immobilizer is a security system including the test unit P with its transmitting and receiving unit E, the control devices $S_i$ and $F_j$ which are connected to the test unit P through the data line BUS, as well as a plurality of portable user code generators.

An identification code word (referred to below as an identification code) which is stored in each control device $S_i$ and $F_j$ is respectively interrogated by the test unit P in order to prevent the control devices $S_i$ and $F_j$ provided with an identification code from being exchanged impermissibly with non-coded control devices. If the identification codes are checked and they are all authorized, then the motor vehicle can be started by activating at least one operationally pertinent control device $S_i$. The immobilizer and the method for operating it are explained in more detail with reference to FIGS. 2 and 3.

Figure 3:
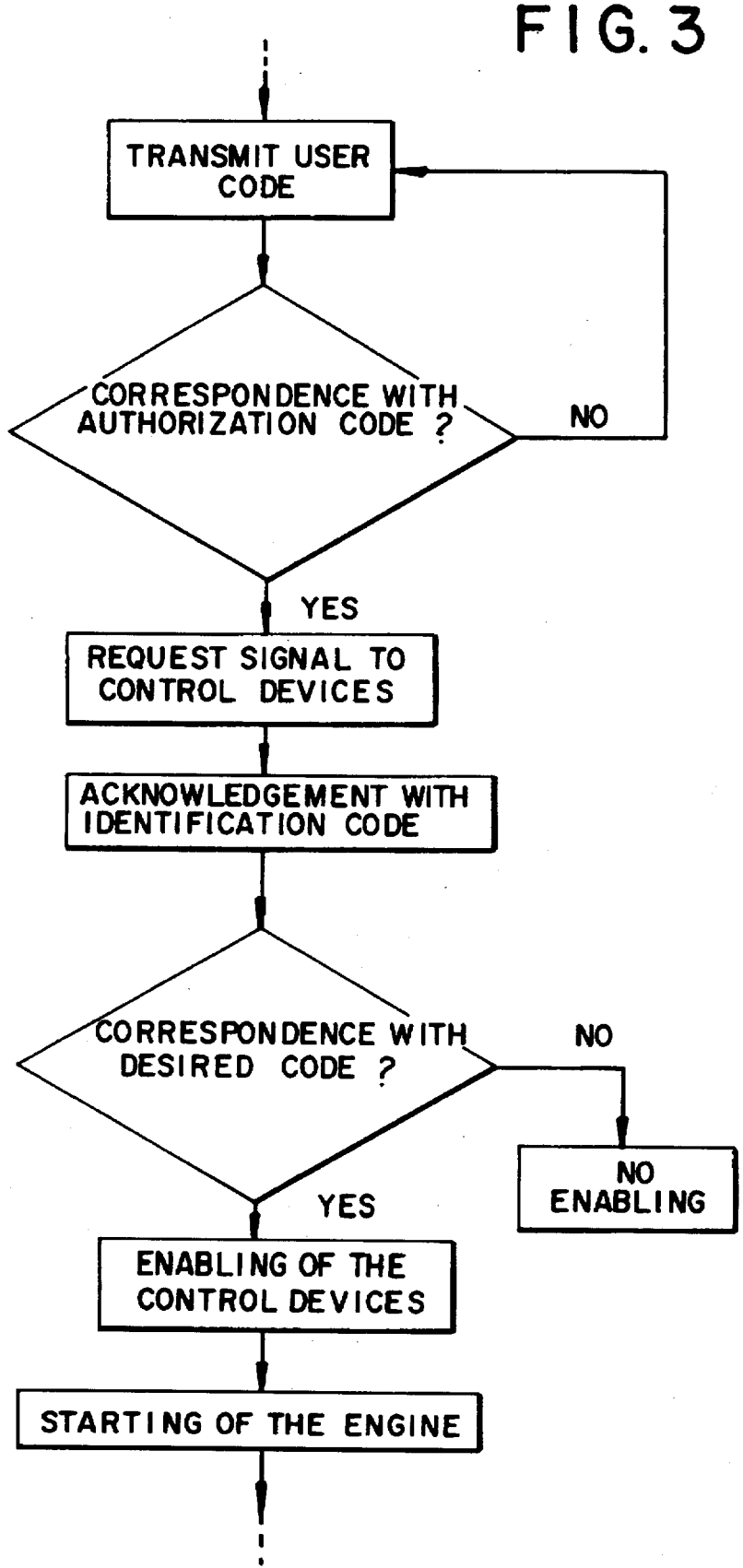
FIG. 3 is a flow diagram of a method for operating the immobilizer.

With reference to the circuit of FIG. 2 and the flow diagram of FIG. 3, it is seen that if a user having a user code generator $G_k$ (where k=1 to 3 in the exemplary embodiment), for example in the form of an ignition key ZS having a transponder G, or in the form of a smart card having a transponder, would like to use the vehicle, then a dialog must take place between the immobilizer and the user code generator $G_k$. The dialog can be initiated, for example, by turning the ignition key ZS in the ignition lock Z. In this case, a check is performed as to whether or not the user code generator $G_k$ is authorized to start the vehicle. For this purpose, the user code is compared with the authorization code in the test unit P.

If the two codes correspond, then a request signal is in turn sent through the data line BUS to all or only some of the connected control devices $S_i$ and $F_j$. The latter receive the request signal and are obliged thereby to reply with their identification code. It is then recorded in the test unit P whether or not and with which identification code the control devices $S_i$ and $F_j$ have replied. For this purpose, the received identification codes are compared with desired code words (desired codes). If all of the control devices $S_i$ and $F_j$ have replied correctly, an enable signal is sent, under the control of the test unit P, to the control device or devices $S_i$, as a result of which starting of the motor vehicle is enabled. Otherwise, the control devices $S_i$ remain in an inactive state.

The operationally pertinent control devices $S_i$, that is to say the control devices which are absolutely necessary for the operation of the motor vehicle, are put into an inactive state when the motor vehicle is turned off. The test unit P which is likewise inhibited in the quiescent state of the motor vehicle also belongs to the operationally pertinent control devices. The inactive state can be cancelled again only by an authorized user.

If one of the control devices $F_j$ which is not absolutely necessary for the operation of the motor vehicle is defective and must be replaced, then it cannot reply at all to the request signal or can reply only with an incorrect identification code. This is recognized by the test unit P. The driver is given a warning through the use of an optical or acoustical indication and his or her attention is drawn to the requirement that the motor vehicle still be in operation only for a short period, for example for a specific trip length, a predetermined time duration or a number of starting operations. Consequently, the motor vehicle can, for example, be brought home from a vacation so that it may be repaired in the local service station and the defective control device $F_j$ can be exchanged. If the defective control device $F_j$ is not exchanged, the motor vehicle will be rendered inoperative by the test unit P after expiration of the period.

For this reason, it is sufficient if not all, but at least a prescribed number of the control devices $S_i$ and $F_j$ reply with their identification code when the interrogation for the identification codes is made. If, for example, four control devices $S_i$ and $F_j$ are interrogated, then it is sufficient if three reply with a valid identification code. Consequently, the availability of the motor vehicle is ensured at all times. Therefore, the situation cannot occur wherein the motor vehicle can no longer be moved at all due to a defective and exchanged control device which is not absolutely necessary for the operation of the motor vehicle.

However, if fewer than the prescribed number of control devices $S_i$ and $F_j$ reply with their identification code, then the test unit P leaves at least one control device $S_i$ in an inactive state, with the result that starting or driving of the motor vehicle is prevented. Accordingly, the inactivated control device $S_i$ must be an operationally pertinent control device, since otherwise the immobilizer would not be effective.

New control devices $S_i$ and $F_j$ are at first in a basic state (initial mode). The initial mode is recognized by the test unit P. If all or the majority of the control devices $S_i$ and $F_j$ are in the initial mode, then all of the control devices $S_i$ and $F_j$ are provided with an identification code and the user code generator $G_k$ is provided with a user code (first initialization). This can occur, for example, after the production of the motor vehicle, that is to say at the end of the assembly line at the site of the automobile manufacturer, with the aid of an authorized non-illustrated identification code generator. The latter stores the identification codes of all of the control devices $S_i$ and $F_j$ which are present in the motor vehicle. During the first initialization, the test unit P establishes which control devices $S_i$ and $F_j$ must actually be tested by the immobilizer.

The first initialization is irreversible, that is to say it cannot be reversed by a thief. Therefore, it is no longer possible to subsequently carry out the first initialization of the control devices $S_i$ and $F_j$.

After the first initialization, the control devices $S_i$ and $F_j$ move into an operating mode. The motor vehicle can be started only in the operating mode, when starting has been initiated by an authorized user code generator $G_k$ and a minimum number of control devices $S_i$ and $F_j$ are connected to the test unit P through the data line BUS.

New control devices $S_i$ and $F_j$ which have been exchanged for defective control devices $S_i$ and $F_j$ are likewise in the initial mode at the start. This is recognized by the test unit P. In this case, only the new control device $S_i$ or $F_j$ can be initialized for the first time (re-initialization), if it is recognized by the test unit P that the remaining control devices $S_i$ and $F_j$ reply with their identification code and at least one authorized user code generator $G_k$ is present.

The first initialization and the re-initialization can also be carried out through a diagnostic interface D, which is present anyway in the motor vehicle and is connected to the data line BUS. By using a non-illustrated diagnostic device which is connected to the diagnostic interface D, it is possible to provide the individual control devices $S_i$ and $F_j$, for example, with the identification codes, if this is authorized by an authorized identification code generator.

New control devices $S_i$ and $F_j$ are always in the initial mode. The initial mode is recognized both during the first initialization and during the re-initialization. A situation in which an unauthorized user exchanges only one control device $S_i$ or $F_j$ and then initializes all of the control devices $S_i$ and $F_j$ of the motor vehicle anew, must be precluded during the re-initialization.

It is also possible to interconnect a plurality of test units P in the immobilizer. A second test unit P can then assume the functioning of the first test unit P if the latter is defective and this is established when the first attempt at starting is made.

The identification codes and the user codes can be stored at least in one other test unit P, in a central computer located at the site of the manufacturer, in a control device $S_i$ or $F_j$ or in each user code generator $G_k$, from where they can be read in the event of authorized access for the purpose of re-initialization of the control devices $S_i$ and $F_j$ if the test unit P should have failed. The authorization for re-initialization can be proved through the use of a transponder which is with the registration document.

The test unit P does not necessarily have to be constructed as a separate device. It can be accommodated in a control device $S_i$ (indicated in FIG. 2 by reference symbol P/S1 and dashed line) and at that location can share components, such as the microprocessor or memory elements, of the control device $S_i$ which are present anyway in the control device.

In order to prevent car theft, the immobilizer may be constructed in such a way that, for example, the number of engine starts or the distance driven is detected, through the use of incrementing or decrementing, by a counter in the test unit P or in a plurality of counters in the respective control devices $S_i$ and $F_j$. In the case of a predetermined counter reading, the motor vehicle is rendered inoperative if the counter has not previously been reset to zero by an external and separate RESET unit.

A RESET can only be carried out with the use of a RESET code which is stored centrally at the site of the manufacturer or in a dedicated transponder which is affixed to the registration document. The RESET unit can be disposed, for example, at home in the garage. It can influence the counter reading by radio. The RESET can also be carried out at an authorized service station by presenting the registration document every time the vehicle is serviced.

A stolen vehicle thus becomes unusable after a while if the counter reading is not reset to zero using by an authorized RESET unit.

A counter may also be present in the user code generator $G_k$. Every time the user code generator $G_k$ is actuated, the counter is increased or decreased by one. The user code generator $G_k$ can be used only up to a prescribed counter reading. Therefore, the counter must occasionally be set to zero.

The identification codes, user codes and the like may be so-called permanent codes which are permanently stored in each case in memory units. They may also vary constantly (so-called changing codes). In this case, the codes are calculated in accordance with a mathematical algorithm, for the determination of which data are stored in the respective memory units. The code is changed after every interrogation operation. This is used for security against tapping. However, it is irrelevant to the invention whether the immobilizer operates by using permanent codes or by using changing codes. In the case of changing codes, all of the data which are used for calculating the codes are stored in the relevant unit, such as the test unit P or the control device, and the codes are stored in the case of the permanent codes.

The request signal can be transmitted during every starting operation. In addition, request signals can be generated continuously at specific time intervals. All of the control devices $S_i$ and $F_j$ connected to the data line BUS or only some of the control devices $S_i$ and $F_j$ can be interrogated, these being established beforehand, for example in accordance with a random principle. The interrogation may also alternate, so that first of all some, for example the first three, of the control devices $S_i$ and $F_j$ and, during the next interrogation operation, some others, namely the next three control devices $S_i$ and $F_j$, are interrogated for their identification code. As a result, the immobilizer is secure against the exchange of individual control devices $S_i$ and $F_j$.

The random alternation of the interrogation of the control devices $S_i$ and $F_j$ makes it more difficult to steal the motor vehicle, since all of the control devices $S_i$ and $F_j$ would have to be exchanged in every case in order to start the motor vehicle. However, any purchase of all of the control devices $S_i$ and $F_j$ can be readily monitored by a spare parts store.

I claim:

1. An immobilizer for a motor vehicle, comprising:

a common data line;

motor vehicle control devices each having an identification code word and each being connected to said common data line; and at least one motor vehicle test unit having desired code words identifying said control devices;

said at least one test unit being connected through said common data line to said control devices;

said at least one test unit transmitting a request signal, at least during every engine starting operation, through said data line to all of said control devices, causing said control devices to transmit back their identification code words;

said at least one test unit comparing the identification code words being sent back with the desired code words and determining how many of said control devices reply with a correct identification code word;

said at least one test unit disabling at least one of said control devices, for preventing starting and driving of the motor vehicle if fewer than a prescribed number of said control devices reply with their identification code word in the event of an interrogation for the identification code words;

and said at least one test unit enabling all of said control devices if at least the prescribed number of said control devices reply with their identification code word in the event of the interrogation.

2. The immobilizer according to claim 1, wherein the identification code word is stored in said control devices.

3. The immobilizer according to claim 1, wherein the identification code word is generated with the aid of an algorithm in said control devices.

4. The immobilizer according to claim 1, wherein the desired code words are stored in said at least one test unit.

5. The immobilizer according to claim 1, wherein the desired code words are calculated with the aid of an algorithm in said at least one test unit.

6. The immobilizer according to claim 1, wherein said at least one test unit and one of said control devices form a structural unit.

7. The immobilizer according to claim 1, wherein the identification code words are stored in at least one of said control devices.

8. The immobilizer according to claim 3, wherein the algorithm for calculating the identification code words are stored in at least one of said control devices.

9. The immobilizer according to claim 1, including at least one portable user code generator in which the identification code words are stored.

10. The immobilizer according to claim 1, including at least one portable user code generator in which an algorithm for calculating the identification code words are stored.

11. The immobilizer according to claim 1, including a user code generator having a user code word, and an initiation device for transmitting the user code word by radio to said at least one test unit causing the request signal to be initiated if the user code word corresponds to an authorization code word stored in said at least one test unit.

12. The immobilizer according to claim 11, wherein the user code word is stored in said user code generator.

13. The immobilizer according to claim 11, wherein the user code word is generated with the aid of an algorithm in said user code generator.

14. The immobilizer according to claim 1, including a steady-state identification code generator in which all of the identification code words are stored and with the aid of which all of said control devices are re-initialized.

15. The immobilizer according to claim 1, including a steady-state identification code generator in which all of the identification code words are stored and with the aid of which only said control devices having been exchanged for defective control devices are re-initialized.

16. A method for operating an immobilizer for a motor vehicle, which comprises:

during each engine start operation of a motor vehicle, transmitting a user code word to a test unit of the motor vehicle and verifying the user code word in the test unit;

transmitting a request signal from the test unit through a data line to all of a given number of control devices, at least during every engine starting operation, causing the given number of control devices to transmit back identification code words;

comparing the identification code words being sent back with the desired code words, in the test unit;

disabling at least one of the control devices, with the test unit, for preventing starting and driving of the motor vehicle if fewer than a the prescribed number of the control devices reply with their identification code word in the event of an interrogation for the identification code words; and enabling all of the control devices, with the test unit, if at least the prescribed number of control devices reply with their identification code word, in the event of the interrogation.

17. The method according to claim 16, which comprises placing at least one of the control devices into an inactive state, with the test unit, after a predetermined time period, if more than the prescribed number of control devices, but not all of the control devices, reply with their identification code word in the event of the interrogation for the identification code words.

18. The method according to claim 16, which comprises carrying out a first initialization, with the test unit, if the test unit recognizes that at least a majority of the control devices being connected to the data line are in a basic state, and carrying out a re-initialization, with the test unit, if it is recognized that at least one of the control devices is in the basic state and remaining control devices as well as at least one user code generator are assigned to the immobilizer as being authorized.

19. The method according to claim 16, which comprises detecting the number of engine starting operations with the aid of at least one counter and placing the motor vehicle into an inactive state after a predetermined number of engine starting operations, with the test unit, for preventing the motor vehicle from being moved, if the counter is not reset to zero by an external RESET unit.

20. The method according to claim 16, which comprises detecting the number of engine starting operations with the aid of at least one counter and placing the motor vehicle into an inactive state after a predetermined number of engine starting operations, with a user code generator, for preventing the motor vehicle from being moved, if the counter is not reset to zero by an external RESET unit.

* * * * *

UNITED STATES PATENT AND TRADEMARK OFFICE
CERTIFICATE OF CORRECTION

PATENT NO : 5,675,490
DATED : October 7, 1997
INVENTOR(S): Anton Bachhuber

It is certified that error appears in the above-identified patent and that said Letters Patent is hereby corrected as shown below:

On title page,
Item [63] should read as follows:

Continuation of PCT/DE94/00917, August 9, 1994.

Signed and Sealed this

Nineteenth Day of May, 1998

Attest:

BRUCE LEHMAN

Attesting Officer

Commissioner of Patents and Trademarks